April 15, 1952     S. SHERROW     2,592,963
LAWN MOWER
Filed Oct. 23, 1948     2 SHEETS—SHEET 2
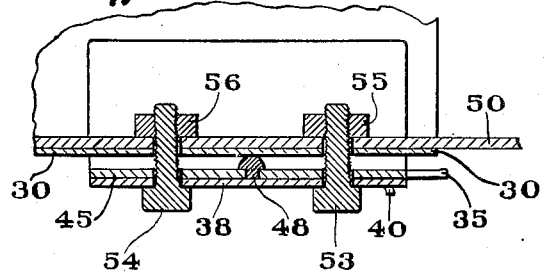
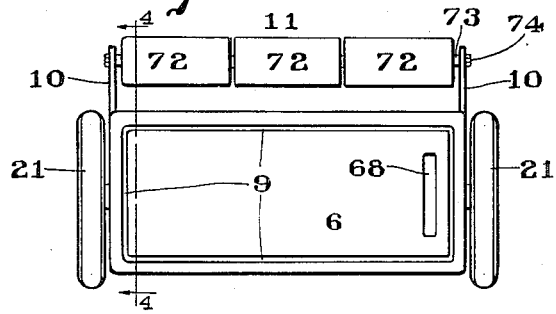
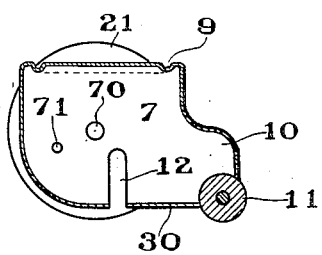
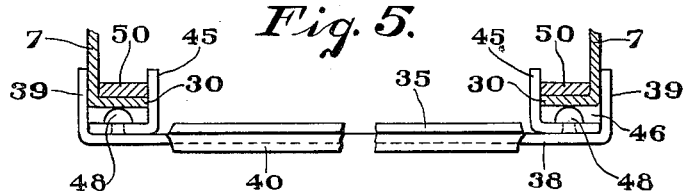
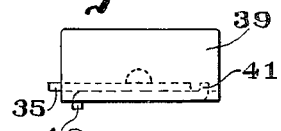
*INVENTOR.*
*SAYLE SHERROW*
BY *Clifford C. Bradbury*
*ATTORNEY*

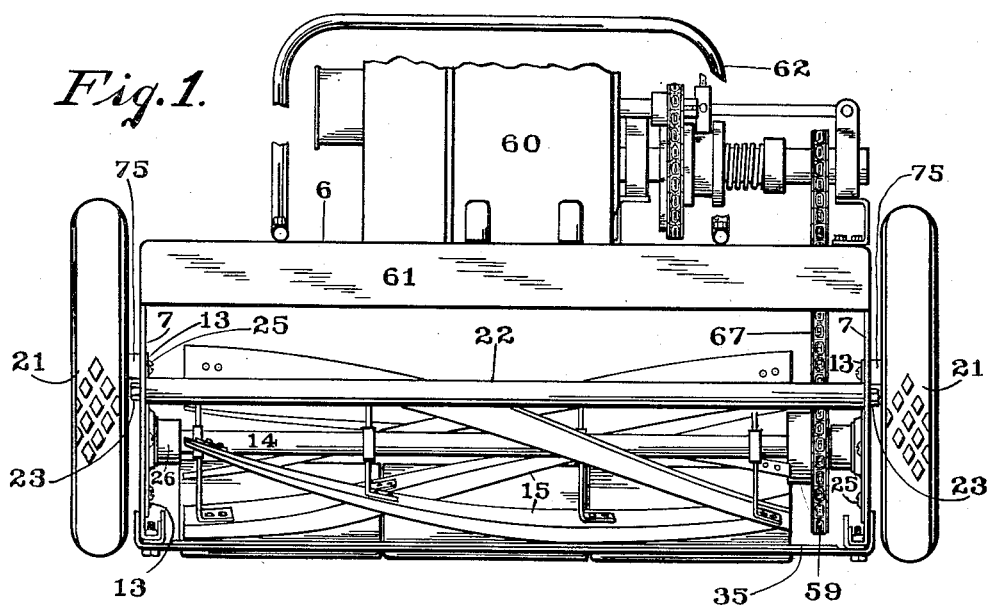

Patented Apr. 15, 1952

2,592,963

UNITED STATES PATENT OFFICE 2,592,963

LAWN MOWER

Sayle Sherrow, Camden, Ohio

Application October 23, 1948, Serial No. 56,121

7 Claims. (Cl. 56—249)

This invention relates to lawn mowers, and one of the objects of the invention is to provide a lawn mower which is simple in structure, strong, durable and economical to produce.

Another object of this invention is to provide a simple one piece supporting frame of sheet metal for lawn mowers.

Another object of the invention is to provide a lawn mower structure in which all of the parts are easily removable and replaceable.

Other objects of the invention pertain to the structural features and details for facilitating the removal and easy adjustment of the operating parts of a lawn mower.

In the drawings illustrating this invention,

Fig. 1 is a view in front elevation, with parts broken away, of a lawn mower embodying the features of this invention.

Fig. 2 is a view in end elevation, on an enlarged scale, with a portion of an end frame member broken away to better illustrate working parts of the mower.

Fig. 3 is a plan view on reduced scale of the structure without the driving motor and the handle.

Fig. 4 is a sectional view taken upon line 4—4 of Fig. 3.

Fig. 5 is a segmented detail view slightly enlarged, with parts in section, of the cutter bar and its mounting as shown in Fig. 1.

Fig. 6 is a detail view of the cutter bar supporting plate looking toward the left end of the cutter bar as shown in Fig. 5.

Fig. 7 is a sectional view taken in a vertical plane extending parallel with the sheet through the belts 53 and 54 of Fig. 2.

As shown in the drawings, the supporting frame structure includes a top plate 6 and two end plates 7 formed integrally with the top plate 6, and extending downwardly at right angles thereto. The top plate is provided with a stiffening rib 9. Each end plate 7 is provided with a rearwardly extending portion 10. A roller 11 is supported near the outer ends of the extended portions 10.

Each end plate is provided with a slot 12 opening downwardly through the lower edge of the plate. At the upper end of each slot 12, and removably secured to the inner face of the plates 7, by bolts 25, is a bearing bushing plate 13 for bearing bushings 26, supporting the ends of a shaft 14 of a cutter blade reel carrying cutter blades 15, 15.

Pinions 16, one on each end of the reel shaft 14, are provided with teeth 19, 19 on their peripheries which are adapted to engage in driving relation with internal teeth 20, 20 in traction wheels 21 rotatably mounted upon stub shafts 75, carried by the end plates 7. A tie rod 22 extends between the end plates 7. Nuts 23, on the ends of the tie rod 22, engage the outer faces of the end plates 7 to secure the tie rod to the plates.

At their lower edges, each of the end plates 7 is provided with an inturned portion 30 at right angle to the plate portion to form a support for the cutter blade assembly.

As shown in Figs. 5, 6, 7 and 8, a cutter blade assembly may comprise a cutter blade 35 of hardened steel, secured to a supporting plate. This plate comprises generally a horizontal portion 38 and vertical end portions 39, 39 at right angles to the portion 38. The edges of the portion 38 are offset in opposite directions, as at 40 and 41, to provide stiffness for the portion 38. Secured to the top portion 38, adjacent the ends thereof, but in spaced relation to the end portions 39, are a pair of angle members 45 which, with the end portions 39, form channels 46. The angle members 45 may be secured to the horizontal portion 38 by spot welding. Midway between the edges of the members 38, and within the channels 46, round headed rivets 48 are inserted through the horizontal legs 49 of each angle member 45. The heads of the rivets 48 constitute pivotal points around which the cutter bar assembly 37 may be swung for adjusting the cutter blades 35 with respect to the reel blades 15, 15. The adjustment angle is controlled by the bolts 53, 54 and nuts 55, 56.

A rectangular metal strip 50 is positioned upon the upper face of the inturned portion 30 of each of the end plates 7, and extends across the corresponding slot 12 in its associated end plate. The end of each of the strips 50, beyond the front edge of the slot 12, is secured to the inturned portion 30 by means of a screw bolt 51, and a nut 52. Toward the roller or backside of the mower, and located upon each side of the rivet head 48, are a pair of bolts 53 and 54 which extend through the horizontal member 38, the angle member 45, the inturned portion 30 of each end plate 7, and the metal strips 50. The bolts 53 and 54 are tightened in place by means of nuts 55 and 56.

A driving motor 60 is mounted upon the top plate and connected by means of a sprocket 59 and chain 67 with the reel blade shaft 14. The drive chain 67 passes through a slot 68 in the top plate 6.

The front edge of the top plate 6 may be turned down as indicated at 61 to provide additional strength and stiffness for the frame.

Openings 70 and 71, through each end plate 7, receive, respectively, the reel shaft 14, and the tie rod 22. The roller 11, which comprises the sections 72, 72, is carried by a rod 73 secured between the extensions 10 of the end plates by means of nuts 74.

A steering handle 62 is secured to the top plate 6.

The traction wheels 21 are secured to the respective stub shafts 75 by means of a nut 65 and a cotter pin 66.

The advantages resulting from a lawn mower constructed in accordance with the features of this invention are many.

The biggest advantage is the one piece sturdy frame constructed of sheet metal and capable of being produced in a finished form from sheet material and without the use of expensive machinery or machine operations.

Another advantage, of course, results from having all of the working parts easily accessible and removable for repair and replacement.

It will be apparent from the drawings and description that the cutter parts of the mower may be easily removed.

By removing the bearing supporting plates 13 from the inside of the end plates 7, 7, the bolts 51, 53 and 54 of the cutter blade assembly, and the rectangular strip 50, and separating the driven chain, the blade reel may be dropped out through the slots 12, 12. This operation may be facilitated by loosening the nuts 23 at the ends of the tie bar 22 and the nuts 74, at the ends of the roller 11, which will permit the end frame members being sprung away from each other.

Although I have shown and described my invention with respect to certain details of construction, some variations may be made from these details without departing from the spirit or scope of my invention.

I claim:

1. In a lawn mower construction in combination, a unitary supporting structure of sheet metal comprising a top plate and two depending end plates each provided with an inturned lower edge and with a slot opening through the lower inturned edge thereof, a blade reel supported directly upon said end plates for removal downwardly through said slots, and a cutter blade removably and separately supported upon the lower inturned edges of the end plates and a plurality of plates to which the cutter blade is attached extending across the open ends of said slots and resting upon the inturned edges of said end plates.

2. In a lawn mower construction, a rectangular sheet metal frame comprising a top member and end members integral with the top member each end member being provided on its lower edge with an inwardly projecting flange portion, and each also being provided with a slot opening downwardly through its lower edge, a blade reel removable downwardly through the slots, a cutter blade and a pair of supporting plates for the cutter blade removably and separately supported upon the inwardly projecting flanges of the end frame members, said cutter blade and reel being connected together only by the slotted end plates.

3. In a lawn mower construction, the combination with a sheet metal frame comprising a top plate and two end plates at right angles to the top plate, and each provided with a right angle flange on its lower edge, of a cutter blade and a supporting assembly therefor comprising a supporting plate provided with upturned ends, an angle member secured to each end of the plates in spaced relation to the upturned end portions to provide a channel therebetween, a pivoting member located in each channel, and means for removably and adjustably securing the cutter bar assembly to the frame with the channels enclosing the flanges on the lower edges of the end frame members with the pivoting members in engagement with the lower faces of said flanges.

4. In a lawn mower construction in combination, a one piece sheet metal frame comprising a top plate and downwardly extending end plates each provided with a downwardly extending slot opening through the lower edge of the end plate and with an inwardly extending flange, a metal strip removably secured at its opposite ends to the flange of each end plate to overlie the corresponding slot, a cutter bar support provided with channel portions at each end adapted to receive the flange portions of the end plates, pivoting members located within the channel portions of the cutter bar support, and a pair of adjustable securing bolts for each end of the cutter blade support, one located upon each side of the pivoting members and extending through the cutter bar support, the end plate flange and the metal strip.

5. The combination with a lawn mower supporting frame of a cutter bar assembly comprising a blade, a supporting plate therefor provided with channel portions at each end for engaging the supporting frame, pivotal means interposed between the supporting plate and the adjacent portions of the frame within the channel portions, and adjustable clamping means for securing the cutter bar assembly to the frame.

6. The combination with a supporting frame for lawn mowers having a pair of depending end members with flanges on the lower edges, of a cutter bar assembly comprising a blade, a supporting plate therefor provided with channel portions at its ends for embracing the flanges of the frame, rocking bearing members between the adjacent faces of the channels and the flanges, and adjusting means extending through the supporting plate and the flanges for swinging the plate upon the bearing members.

7. The combination of a lawn mower supporting frame having depending end plates provided on their lower edges with right angle flange members, of a cutter bar assembly comprising a cutter blade, a supporting plate for the cutter blade provided with channel portions in its opposite ends adapted to embrace the flanges, rocker bearing members secured to the inner face of the plate within the channel to engage the lower faces of the flanges, and adjusting screws extending through the supporting plate and the flanges upon each side of the rocker bearing member.

SAYLE SHERROW.

REFERENCES CITED

The following references are of record in the file of this patent:

UNITED STATES PATENTS

| Number | Name | Date |
|---|---|---|
| 1,809,693 | Hessenbruch | June 9, 1931 |
| 2,199,919 | Limbach | May 7, 1940 |
| 2,468,839 | Rodesci | May 3, 1949 |
| 2,477,453 | Harley | July 26, 1949 |